United States Patent [19]

Hamayasu

[11] Patent Number: 4,503,634
[45] Date of Patent: Mar. 12, 1985

[54] FISH HOOK

[75] Inventor: Norio Hamayasu, Sakai, Japan

[73] Assignee: Shimano Industrial Company Limited, Osaka, Japan

[21] Appl. No.: 212,033

[22] Filed: Dec. 2, 1980

[30] Foreign Application Priority Data

Dec. 25, 1979 [JP] Japan ............................ 54-181145[U]

[51] Int. Cl.³ .............................................. A01K 83/00
[52] U.S. Cl. .................................. 43/44.83; 43/42.49; 43/43.16
[58] Field of Search ................... 43/42.49, 44.83, 43.16

[56] References Cited

U.S. PATENT DOCUMENTS

| 237,566 | 2/1881 | Marion | 43/44.83 |
| 1,093,000 | 4/1914 | Kinsey | 43/44.83 |
| 2,995,858 | 8/1961 | Rathmann | 43/44.83 |
| 3,564,749 | 2/1971 | Fujii | 43/43.16 |

FOREIGN PATENT DOCUMENTS

| 964991 | 2/1950 | France | 43/43.16 |
| 1284585 | 1/1962 | France | 43/44.83 |
| 6551 | of 1887 | United Kingdom | 43/44.83 |
| 7397 | of 1888 | United Kingdom | 43/44.83 |

OTHER PUBLICATIONS

The Fisherman's Encyclopedia; Gabrielson; Stackpole & Heck, Inc.; 1950; pp. 116–124.

Primary Examiner—Nicholas P. Godici
Assistant Examiner—Kurt Rowan
Attorney, Agent, or Firm—Stevens, Davis, Miller & Mosher

[57] ABSTRACT

A fish hook comprising a stem having a head, and a pointed end formed in continuation of the stem, bent toward the head, and having a barb, the stem being provided at the head with a flange extending radially outwardly of the stem and retaining a fishing line which is wrapped beneath the head, the flange having a cutout for guiding the fishing line.

3 Claims, 3 Drawing Figures

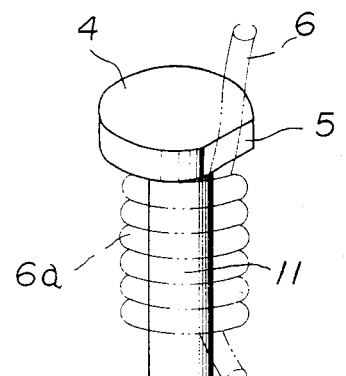
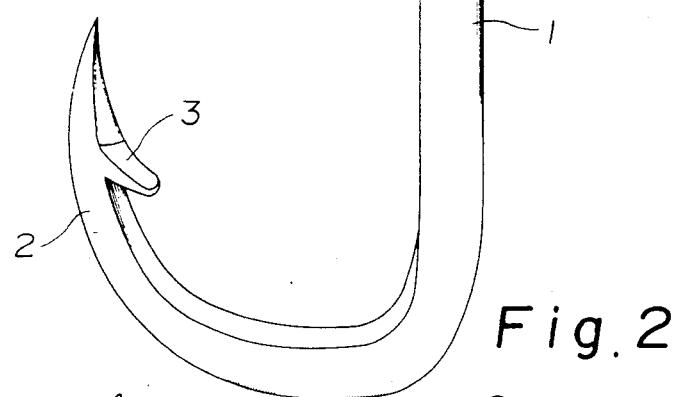
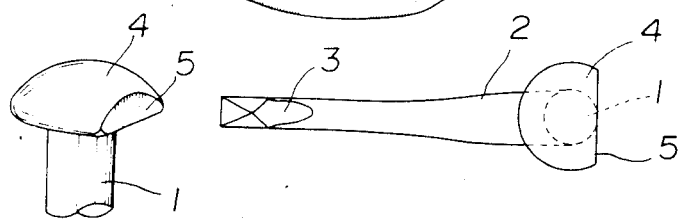

FISH HOOK

FIELD OF THE INVENTION

This invention relates to a fish hook to which a fishing line is tied, and more particularly to a fisk hook comprising a headed stem and a pointed end portion formed in continuation of the stem and bent toward the head thereof.

BACKGROUND OF THE INVENTION

Generally, a fish hook is tied with a fishing line wrapped several times around the head of the hook. The head of the conventional fish hook comprises a fishing line retaining portion formed of a flat depressed end of a stem of the hook, the retaining portion having a larger width than an outer diameter of the stem.

However, the stem and flat depressed retaining portion are connected through curved edges, and the outer edge of the retaining portion becomes sharp.

The fishing line tied to the head of the hook is retained at least by the retaining portion not to escape from the head. However, when a fish is hooked to apply a greater tensile load to the line tied onto the stem head, the line happens to escape from the head beyond the retaining portion or is cut by rubbing against the sharp edge thereof.

SUMMARY OF THE INVENTION

In the light of the aforesaid problem, this invention has been designed. An object of the invention is to provide a fish hook to which the fishing line is securely tied without coming off of the stem head beyond the retaining portion or being cut by rubbing against the sharp edge thereof even when a fish is hooked to apply a greater load to the line.

The inventor has perceived that the fishing line retaining portion formed at the stem head, conventionally, is made flat, thereby creating the above problem. Hence, he has designed an improvement in the retaining portion. The improvement is that at the head of the stem of the fish hook is provided a flange extending radially outwardly from the stem, the flange forming the retaining portion for retaining the fishing line in order to overcome the above problem in the conventional hook. Furthermore, the flange is provided with a cutout for guiding therethrough the fishing line to the stem, so that the fishing line tied to the head does not interfere with the flange, and the pointed end of the hook is not displaced with respect to the fishing line, but kept in a proper position notwithstanding the fact that the stem head has the flange.

BRIEF DESCRIPTION OF THE DRAWINGS

FIG. 1 is a perspective view of an embodiment of a fish hook of the invention,

FIG. 2 is a plan view of the FIG. 1 embodiment, and

FIG. 3 is a perspective view of a modified embodiment of the invention, in which a head portion only is shown.

DETAILED DESCRIPTION OF THE INVENTION

Referring to the drawings, reference numeral 1 designates a stem of a fish hook, which has a head 11. The stem 1 is provided at its utmost end, i.e. at the side opposite to the head 11, with a pointed end 2 formed continuously from the stem 1, bent toward the head 11 and having a barb 3.

The head 11 at the stem 1 is provided with a round flange integral therewith and extending radially outwardly of the stem 1. At one side circumferential of the flange 4, preferably at one side opposite to the pointed end 2, is provided a cutout 5 having a flat surface parallel to and adjacent a stem 1 to guide the fishing line 6 toward the stem 1.

In the above construction, the fishing line 6 is wrapped several times around the head 11 and tied thereto, so that the tied portion 6a of fishing line 6 is retained against the flange 4, thereby ensuring that the line does not separate from the stem 1.

The fishing line 6 is guided through the cutout 5 at the flange 4 to extend outwardly from a tied portion 6a of the line 6.

The reason for the provision of cutout 5 at the flange 4 is that the fishing line 6 is guided by the cutout 5 to extend from the tied portion 6a at the head 11 substantially straight and in parallel to the stem 1 so that contact resistance between the peripheral edge of flange 4 and the line 6 is reduced as much as possible to thereby eliminate the wear on the line 6 caused by its contact with the edge, and the fish hook is kept balanced in a vertical manner without slanting in contact with the outer periphery of flange 4 when the fish hook sinks in the water when fishing.

The flange 4, which is cut out with a flat surface as shown, alternatively may be provided with a vertically extending notch which is parallel with the stem portion and having a width larger than the diameter of line 6. In either case, the cutout 5 is level substantially with the outer surface of stem 1 as shown in FIG. 2. That is, the flat surface provided by the cutout is in a place tangential and adjacent to the stem portion, as shown in FIG. 2.

The stem 1 is hammered at its end by a header or the like to form the round flange 4. Alternatively, the flange 4 may be frustoconical or hemispherical.

The fish hook constructed as foregoing is tied with the fishing line 6 wrapped several times around the stem head 11, so that the line 6 engages at its tied portion 6a with the inside of flange 4 which extends radially outwardly from the stem 1 and is retained to the flange 4, thereby securely preventing the line 6 from coming off of the stem head 11. The fishing line 6 also is drawn out of the tied portion 6a through the cutout 5 at the opposite side to the pointed end 2, at which time the cutout 5 enables the line 6 to be drawn in a vertical manner, thereby keeping the fish hook from slanting with respect to the line 6.

As clearly understood from the above description, the fish hook of the invention is provided at the head 11 of stem 1 with the flange 4 extending radially outwardly of the stem 1 so that even when a greater load is applied to the line 6 wrapped several times around the stem 1 and tied thereto, the line tied portion 6a is retained to the flange 4 to thereby prevent escape of the line tied portion 6a from the stem head 11. Also, the line tied portion 6a retained to the flange 4 will not be cut by the sharp edge of a conventional flat depressed retaining portion as with conventional structures.

Furthermore, the cutout 5 is formed partially at the outer periphery of flange 4 so that the fishing line 6 is guided by the cutout 5 to extend from the tied portion 6a. Hence, the fishing line 6 scarcely contacts with the angular edge even when formed at the flange 4, thereby preventing the line 6 from being cut, and also the fish hook when in use, can be kept substantially in the same direction as the line 6 without being slanted with respect thereto.

While a preferred embodiment of the invention has been described using specific terms, such description is for illustrative purpose only and it is to be understood that changes and variations may be made without departing from the spirit or scope of the following claims.

What is claimed is:

1. A fishing hook comprising:
    a substantially straight stem portion terminating at one end with a flange, sad flange having an unbroken, solid upper surface, said flange surface having an outer periphery extending radially beyond and around the periphery of said stem portion, said flange surface having a cutout along part of its radial periphery which provides a surface which extends substantially parallel to and is contiguous and level with said stem portion, said cutout reducing wear to a fishing line which passes through said cutout and is wrapped around said stem portion adjacent said flange; and
    a hook member integral with the remaining end of said stem portion, said hook member being bent so that the end of said hook member is opposite to and substantially parallel with said stem portion.

2. The fish hook of claim 1, wherein said surface is a flat surface parallel with said stem portion.

3. The fish hook of claims 1 or 2 further comprising a barb connected adjacent the end of said hook member.

* * * * *